(12) United States Patent
Inoue et al.

(10) Patent No.: US 7,081,314 B2
(45) Date of Patent: *Jul. 25, 2006

(54) FUEL CELL HAVING SEALANT FOR SEALING A SOLID POLYMER ELECTROLYTE MEMBRANE

(75) Inventors: Masajiro Inoue, Wako (JP); Nobuaki Kimura, Wako (JP); Toshihiko Suenaga, Wako (JP); Harumi Hatano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/847,901

(22) Filed: May 2, 2001

(65) Prior Publication Data

US 2001/0044042 A1  Nov. 22, 2001

(30) Foreign Application Priority Data

May 2, 2000   (JP)   ............................ P2000-133864

(51) Int. Cl.
*H01M 2/02*   (2006.01)
(52) U.S. Cl. ............................ 429/34; 429/35; 429/30; 429/44
(58) Field of Classification Search ................. 429/35, 429/36, 30, 40, 44, 34
See application file for complete search history.

(56) References Cited

U.S. PATENT DOCUMENTS

| | | | |
|---|---|---|---|
| 4,510,213 A | 4/1985 | Schnacke | 429/36 |
| 5,464,700 A | 11/1995 | Steck et al. | 429/30 |
| 6,007,933 A * | 12/1999 | Jones | 429/38 |
| 6,451,468 B1 | 9/2002 | Adachi | |
| 2002/0031698 A1 * | 3/2002 | Inoue et al. | 429/35 |
| 2004/0137305 A1 * | 7/2004 | Inoue et al. | 429/36 |

FOREIGN PATENT DOCUMENTS

| | | |
|---|---|---|
| EP | 1 009 051 A2 | 6/2000 |
| JP | 59-103077 | 6/1984 |
| JP | 61-143946 | 7/1986 |
| JP | 6-325777 | 11/1994 |
| JP | 7-249417 | 9/1995 |
| JP | 8-45517 | 2/1996 |
| JP | 8-148169 | 6/1996 |
| JP | 9-289029 | 11/1997 |
| JP | 11-204122 | 7/1999 |
| JP | 2000-48832 | 2/2000 |
| JP | 2000-133288 | 5/2000 |
| WO | WO 98/33221 | 7/1998 |
| WO | WO 99/04446 A1 | 1/1999 |
| WO | WO 99/53559 A1 | 10/1999 |
| WO | WO 02/23656 A1 | 3/2002 |

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

The fuel cell of the present invention comprises: a membrane electrode assembly having a solid polymer electrolyte membrane, an anode side diffusion electrode located at one side of the solid polymer electrolyte membrane, and a cathode side diffusion electrode located at the other side of the solid polymer electrolyte membrane, the anode side diffusion electrode comprising an anode electrode, and a first gas diffusion layer, the cathode side diffusion electrode comprising a cathode electrode, and a second gas diffusion layer; a pair of separators which hold the membrane electrode assembly; and a seal, provided onto the separators, which was liquid sealant at the time of application. The sealant makes contact with at least one of end faces of the first gas diffusion layer and the second gas diffusion layer, while the membrane electrode assembly is located between the separators.

6 Claims, 8 Drawing Sheets

FUEL CELL HAVING SEALANT FOR SEALING A SOLID POLYMER ELECTROLYTE MEMBRANE

BACKGROUND OF THE INVENTION

1. Field of the Invention

The present invention relates to a fuel cell, comprising a membrane electrode assembly having a solid polymer electrolyte membrane, an anode side diffusion electrode, and a cathode side diffusion electrode, and a pair of separators holding the membrane electrode assembly, and in particular, to a fuel cell which can reliably seals the membrane electrode assembly between the separators, and which prevents a reaction gas from flowing around the membrane electrode assembly.

2. Description of the Related Art

In conventional fuel cells, the membrane electrode assembly comprises a solid polymer electrolyte membrane, and an anode side diffusion electrode and a cathode side diffusion electrode which are located at both sides of the membrane. The membrane electrode assembly is held by a pair of separators. By supplying fuel gas (for example, hydrogen gas) onto a reaction face of the anode side diffusion electrode, the hydrogen gas becomes ionized, and moves toward the cathode side diffusion electrode through the solid polymer electrolyte membrane. The electrons produced in this process are extracted to an external circuit, and are utilized as electric energy of a direct current. Since oxidant gas (for example, air which contains oxygen) is supplied to the cathode electrode, water is generated by the reaction of the hydrogen ions, the electrons, and the oxygen.

Figure 11:
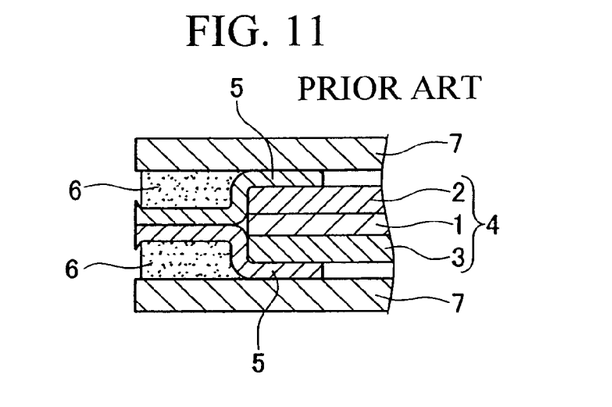
FIG. 11 is a cross-sectional view showing the conventional technique.

An example is explained with reference to FIG. 11. In FIG. 11, reference numeral 1 denotes the solid polymer electrolyte membrane. A fuel cell 4 is assembled such that the solid polymer electrolyte membrane 1 is held between gas diffusion electrodes (an anode side diffusion electrode and a cathode side diffusion electrode) 2 and 3. Sheet-type gaskets 5 which have openings corresponding to the reaction faces of the fuel cell 4 are provided at both sides of the fuel cell 4. While the gaskets 5 cover the edges of the fuel cell 4 and press the edges of the fuel cell 4 using outer pressers 6, the fuel cell 4 is held between separators 7 (disclosed in Japanese Unexamined Patent Application. First Publication No. Hei 6-325777).

Figure 12:
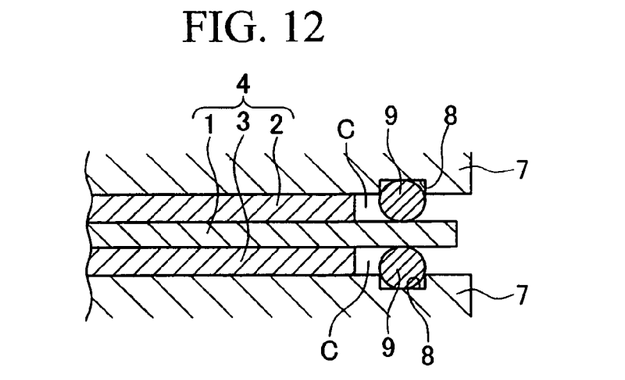
FIG. 12 is a cross-sectional view showing the other conventional technique.

As shown in FIG. 12, the rectangular fuel cell 4 is assembled such that the solid polymer electrolyte membrane 1 is held between the gas diffusion electrodes 2 and 3. A grooves 8 are formed in a pair of separators 7, and O-rings 9 are installed therein. The O-rings 9 supports the solid polymer electrolyte membrane 1 while the fuel cell 4 is held between the separators 7 and 7 (disclosed in Japanese Unexamined Patent Application. First Publication No. Hei 8-148169).

In the above conventional fuel cell, the gaskets 5 separate the spaces between the separators 7 and the gas diffusion electrodes 2 and 3 from the outside. Therefore, this fuel cell advantageously prevents the leakage of the fuel gas and the oxidant gas, and prevents the mixing of those gases, to thereby achieve efficient electric power generation. Variations in the thickness of the separators 7 and 8 and the gas diffusion electrodes 2 and 3 are unavoidable. Therefore, when the gaskets 5 which have varying thicknesses are combined with the separators 7 and the gas diffusion electrodes 2 and 3, the reaction force produced by the gaskets is not uniform. Thus, the problem is pointed out that the sealing between the separators 7 and the gas diffusion electrodes 2 and 3 is not uniform.

To achieve the reliable sealing, the manufacturing sizes of the separators 7 and the gas diffusion electrodes 2 and 3 must be accurately controlled, and, as a result, manufacturing costs are increased.

The above-mentioned fuel cell has problems in that the surface pressure of the gasket 5 varies in the peripheries of the openings of the separators 7, and in that a partial bending stress acts in the peripheries of the openings.

Particularly, when the fuel cell is provided in a vehicle, the thickness of the separator 7 must be adjusted so as to set the bending stress acting on the separator 7 with respect to the varying surface pressure of the gasket 5 less than a predetermined value. In this case, the fuel cell stack in which a number of fuel cells are stacked is large, and reduces the cabin.

Further, in the second conventional fuel cell, the O-rings securely seal the space C between the separators 7 and the fuel cell 4. However, the gas leaking from the end faces of the gas diffusion electrodes 2 and 3 does not contribute to the reaction, and flows onto the end surfaces of the gas diffusion electrodes 2 and 3, thus reducing the efficiency of the electric power generation.

BRIEF SUMMARY OF THE INVENTION

It is therefore an object of the present invention to provide a fuel cell which improves the sealing between the membrane electrode assembly and the separators, preventing the reduction of the efficiency in the electric power generation.

In the first aspect of the present invention, the fuel cell comprises: a membrane electrode assembly having a solid polymer electrolyte membrane, an anode side diffusion electrode located at one side of the solid polymer electrolyte membrane, and a cathode side diffusion electrode located at the other side of the solid polymer electrolyte membrane, the anode side diffusion electrode comprising an anode electrode, and a first gas diffusion layer, the cathode side diffusion electrode comprising a cathode electrode, and a second gas diffusion layer; a pair of separators which hold the membrane electrode assembly; and a seal, provided onto the separators, which was liquid sealant at the time of application. The sealant makes contact with at least one of end faces of the first gas diffusion layer and the second gas diffusion layer, while the membrane electrode assembly is located between the separators.

In the second aspect of the present invention, the fuel cell further comprises: a projection which extends from the solid polymer electrolyte membrane and which projects from the peripheries of the anode side diffusion electrode and the cathode side diffusion electrode. The sealant makes contact with the projection.

In the third aspect of the present invention, the seal makes contact with both end faces of the first gas diffusion layer and the second gas diffusion layer.

In the fourth aspect of the present invention, the seal makes contact with end faces of one of the anode electrode and the cathode electrode.

In the fifth aspect of the present invention, the seal is provided in grooves formed in the separator.

According to the present invention, the liquid sealant (which means liquid or gel sealant) is directly in contact with the projecting portion provided at the periphery of the solid polymer electrolyte membrane, is pressed between the solid polymer electrolyte membrane and the separators, fitting the varying sizes of the seal sections, and maintains gas-tightness between the solid polymer electrolyte membrane and the separators. Therefore, the reaction force produced by the seal is uniform throughout the periphery between the separators and the membrane electrode assembly, thereby making the sealing uniform. The manufacturing sizes of the separators and the membrane electrode assembly in the directions of thickness need not be so specific. Management of the accuracy in size is easy, and manufacturing costs can be reduced.

Further, the seal makes contact with the end faces of the anode electrode and the second gas diffusion layer, and of the cathode electrode and the first gas diffusion layer. The reaction gas leaking from the end faces is prevented from traveling along the peripheries of the fuel cell. Thus, the supplied gas reliably contributes to the electric power generation, and contribute to improve the power generating efficiency.

DETAILED DESCRIPTION OF THE INVENTION

The embodiment of the present invention will be explained with reference to the figures.

Figure 1:
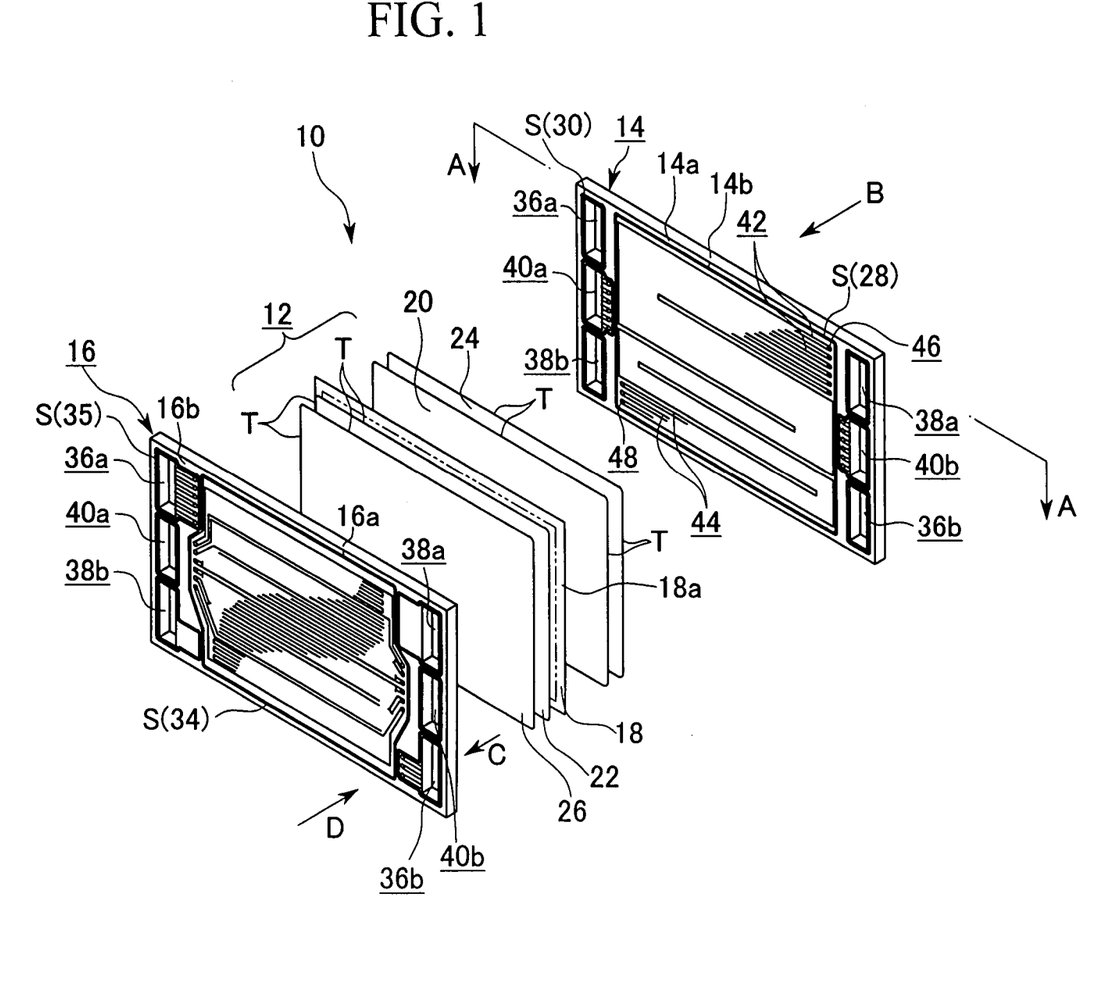
FIG. 1 is an exploded and perspective view showing the embodiment of the present invention.

FIG. 1 is an exploded perspective view showing the fuel cell of the present invention. The fuel cell unit 10 comprises a membrane electrode assembly 12, and first and second separators 16 holding the fuel cell unit. A fuel cell stack for a vehicle is assembled by stacking a number of fuel cell units 10.

The membrane electrode assembly 12 comprises a solid polymer electrolyte membrane 18, and a cathode electrode 20 and an anode electrode 22 which hold both sides of the solid polymer electrolyte membrane 18. Each of the cathode electrode 20 and the anode electrode 22 has a first gas diffusion layer 24 and a second gas diffusion layer 26 which are made of, for example, porous carbon cloth, or porous carbon paper. The solid polymer electrolyte membrane 18 is made of perfluorosulfonic acid polymer. The cathode electrode 20 and the anode electrode 22 are made of Pt. A cathode side diffusion electrode (gas diffusion electrode) comprises the cathode electrode 20 and the first gas diffusion layer 24, while an anode side diffusion electrode (gas diffusion electrode) comprises the anode electrode 22 and the second gas diffusion layer 24.

The solid polymer electrolyte membrane 18 has a projecting portion which projects from the edges of the cathode electrode 20 and the anode electrode 22 which hold the solid polymer electrolyte membrane 18. A liquid sealant S applied on the first and second separators 14 and 16 corresponding to the projecting portion 18a is directly in contact with both sides of the projecting portion 18a.

Figure 3:
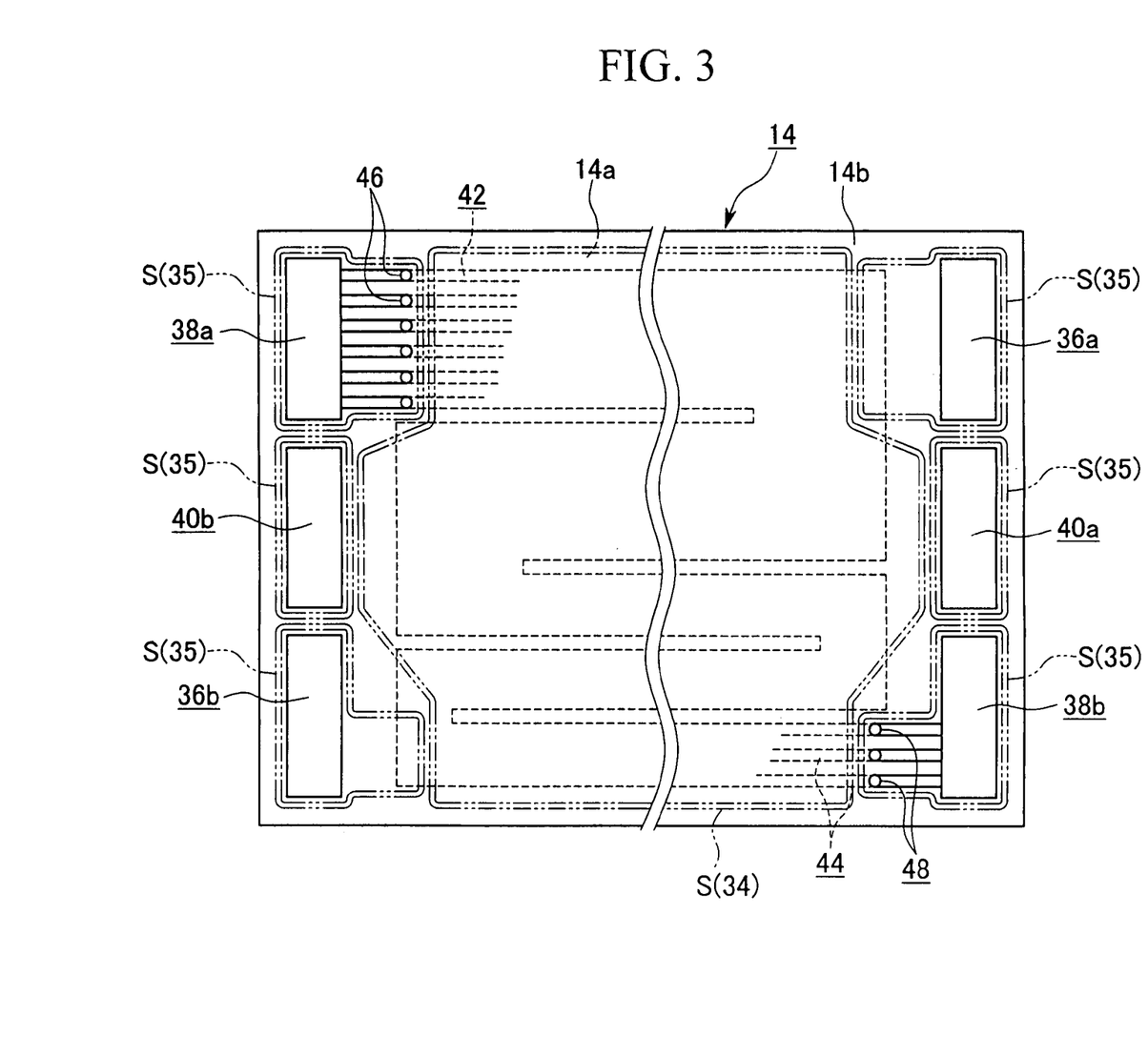
FIG. 3 is a view showing a first separator of the embodiment from the direction of arrow B in FIG. 1.

As shown in FIG. 3, the first separator 14 has an inlet side fuel gas opening 36a for allowing a fuel gas such as a gas containing hydrogen to pass through, at the upper right end of and close to the edge of the first separator 14, and it has an inlet side oxidant gas opening 38a for allowing an oxidant gas, such as a gas containing oxygen, or air, to pass through, at the upper left end of and close to the edge of the first separator 14.

An inlet side coolant opening 40a which allows coolant, such as pure water, ethylene glycol, or oil, to pass through is provided at the right end in the horizontal direction and in the middle in the vertical direction of the first separator 14. An outlet side coolant opening 40b which allows the used coolant to pass through is provided at the left end in the horizontal direction and in the middle in the vertical direction of the first separator 14.

An outlet side fuel gas opening 36b for allowing the fuel gas to pass through is provided at the lower left end of and close to the edge of the first separator 14, and is disposed diagonally with respect to the inlet side fuel gas opening 36a. An outlet side oxidant gas opening 38b for allowing the oxidant gas to pass through is provided at the lower right end of and close to the edge of the first separator 14, and is disposed diagonally with respect to the inlet side oxidant gas opening 38a.

As shown in FIG. 1, a plurality of, for example, six, independent first oxidant gas channels 42 is formed on a surface 14a opposite the cathode electrode 20 of the first separator 14. They start around the inlet side oxidant gas opening 38a, and run horizontally while meandering vertically downward in the direction of gravity. These first oxidant gas channels 42 merge into three second oxidant gas channels 44, and the second oxidant gas channels 44 end around the outlet side oxidant gas opening 38b.

As shown in FIG. 3, the first separator 14 has first oxidant gas connecting passages 46 which pass through the first separator 14, whose ends are connected to the inlet side oxidant gas opening 38a on a surface 14b opposite the surface 14a, and whose other ends are connected to the first oxidant gas channels 42 on the surface 14a. Further, the first separator 14 has second oxidant gas connecting passages 48 which pass through the first separator 14, whose ends are connected to the outlet side oxidant gas opening 38b on the surface 14b, and whose other ends are connected to the second oxidant gas channels 48 on the surface 14a.

Figure 4:
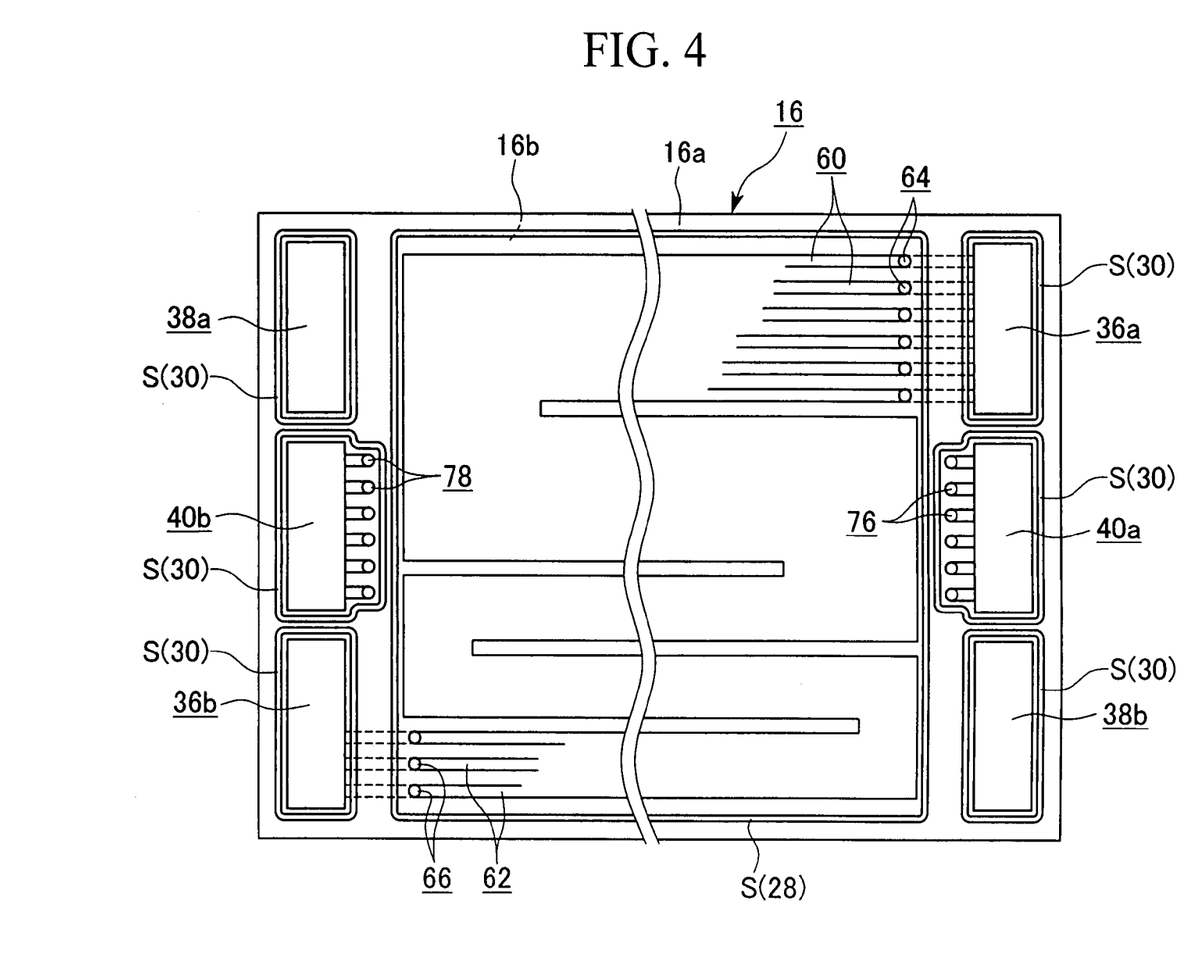
FIG. 4 is a view showing a second separator of the embodiment from the direction of arrow C in FIG. 1.
Figure 5:
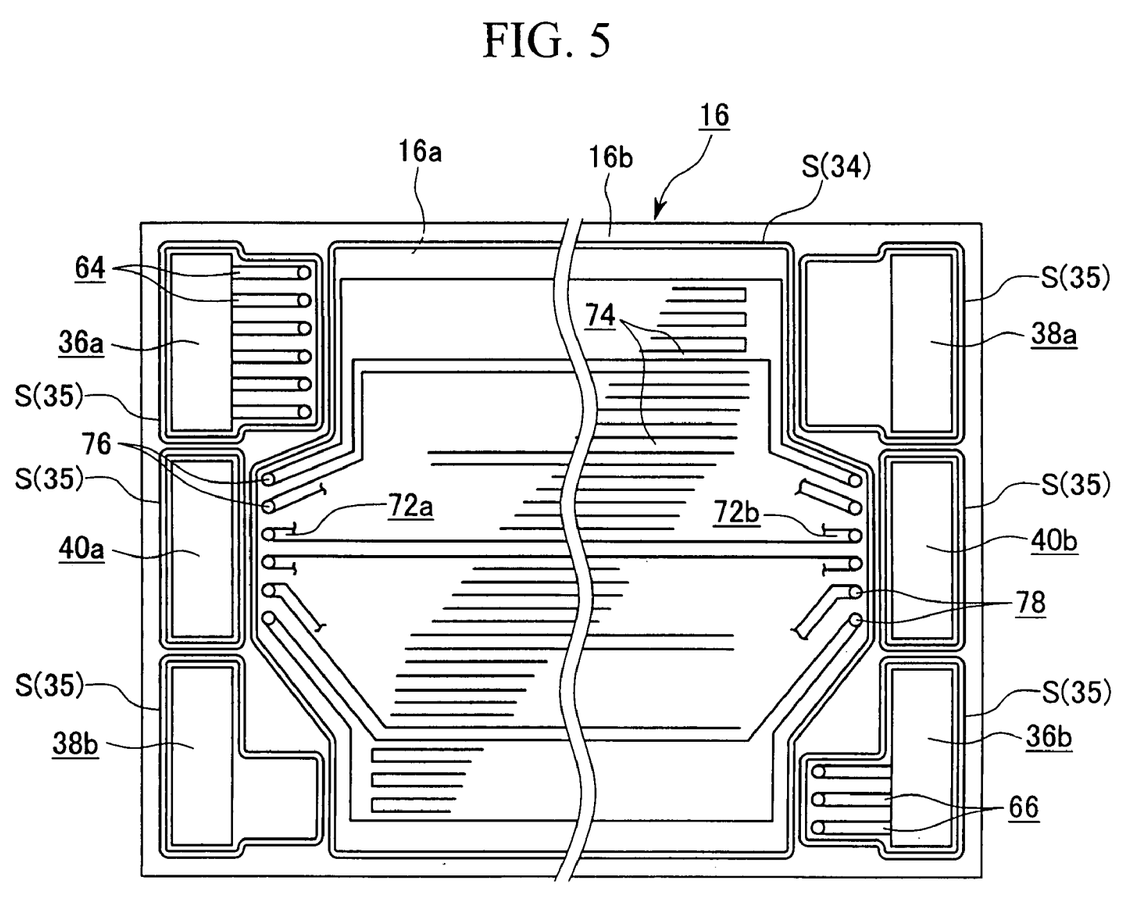
FIG. 5 is a view showing a second separator of the embodiment from the direction of arrow D in FIG. 1.

As shown in FIGS. 4 and 5, an inlet side fuel gas opening 36a, an inlet side oxidant gas opening 38a, an inlet side coolant opening 40a, an outlet coolant opening 40b, an outlet side fuel gas opening 36b, and an outlet oxidant gas opening 38b, which are located at both ends of and close to the edges of the second separator 16, in a manner similar to the openings of the first separator 14.

A plurality of, for example, six, first fuel gas channels 60 are formed on a surface 16a of the second separator 16, and they start around the inlet side fuel gas opening 36a. The first fuel gas channels 60 run horizontally while meandering vertically downward in the direction of gravity, and merge into three second fuel gas channels 62. The second fuel gas channels 62 end around the outlet side fuel gas opening 36b.

The separator 16 has first fuel gas connecting passages 64 which connect the inlet side fuel gas opening 36a on the surface 16b to the first fuel gas channels 60, and second fuel gas connecting passages 66 which connect the outlet side fuel gas opening 36b on the surface 16b to the second fuel gas channels 62. The passages 64 and 66 pass through the second separator 16.

Figure 2:
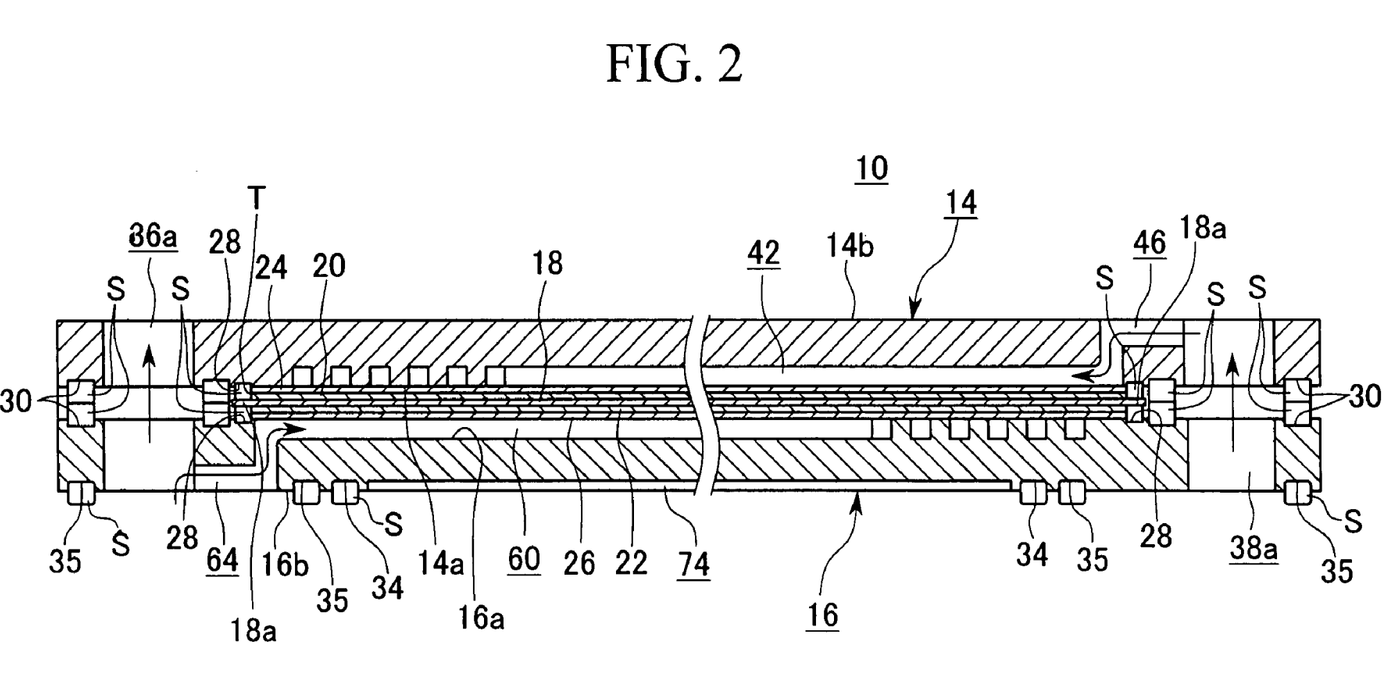
FIG. 2 is a cross-sectional view along the line A—A in FIG. 1.

As shown in FIGS. 2 and 5, a plurality of main channels 72a and 72b which act as coolant channels are formed on the surface 16b of the second separator 16, within the area enclosed by the liquid sealant S, and close to the inlet side coolant opening 40a and the outlet side coolant opening 40b. A plurality of branch channels 74 branch off from the main channels 72a and 72b, and extend in the horizontal direction.

The second separator 16 has first coolant connecting passages 76 which connect the inlet side coolant opening 40a to the main channels 72a, and second coolant connecting passages 78 which connect the outlet coolant opening 40b to the main channels 72b. The passages 76 and 78 pass through the second separator 16.

As shown in FIG. 4, a groove 28 is formed on the surface 16a of the second separator 16, which holds the solid polymer electrolyte membrane 1, opposite the anode electrode 22, and corresponds to the projecting portion 18a of the solid polymer electrolyte membrane 18. The liquid sealant S is put into the groove 28. Further, grooves 30 enclose the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b which are on the surface 16a of the second separator 16. The liquid sealant S is put into the grooves 30. The grooves 30 around the inlet side coolant opening 40a and the outlet side coolant opening 40b enclose the first and second coolant connecting passages 76 and 78.

As shown in FIG. 1, grooves 28 and 30 are formed on the surface 14a of the first separator 14, which holds the membrane electrode assembly 12 with the second separator 16, opposite the cathode electrode 20, and correspond to the grooves 28 and 30 on the second separator 16. The liquid sealant S is put into these grooves 28 and 30.

Figure 6:
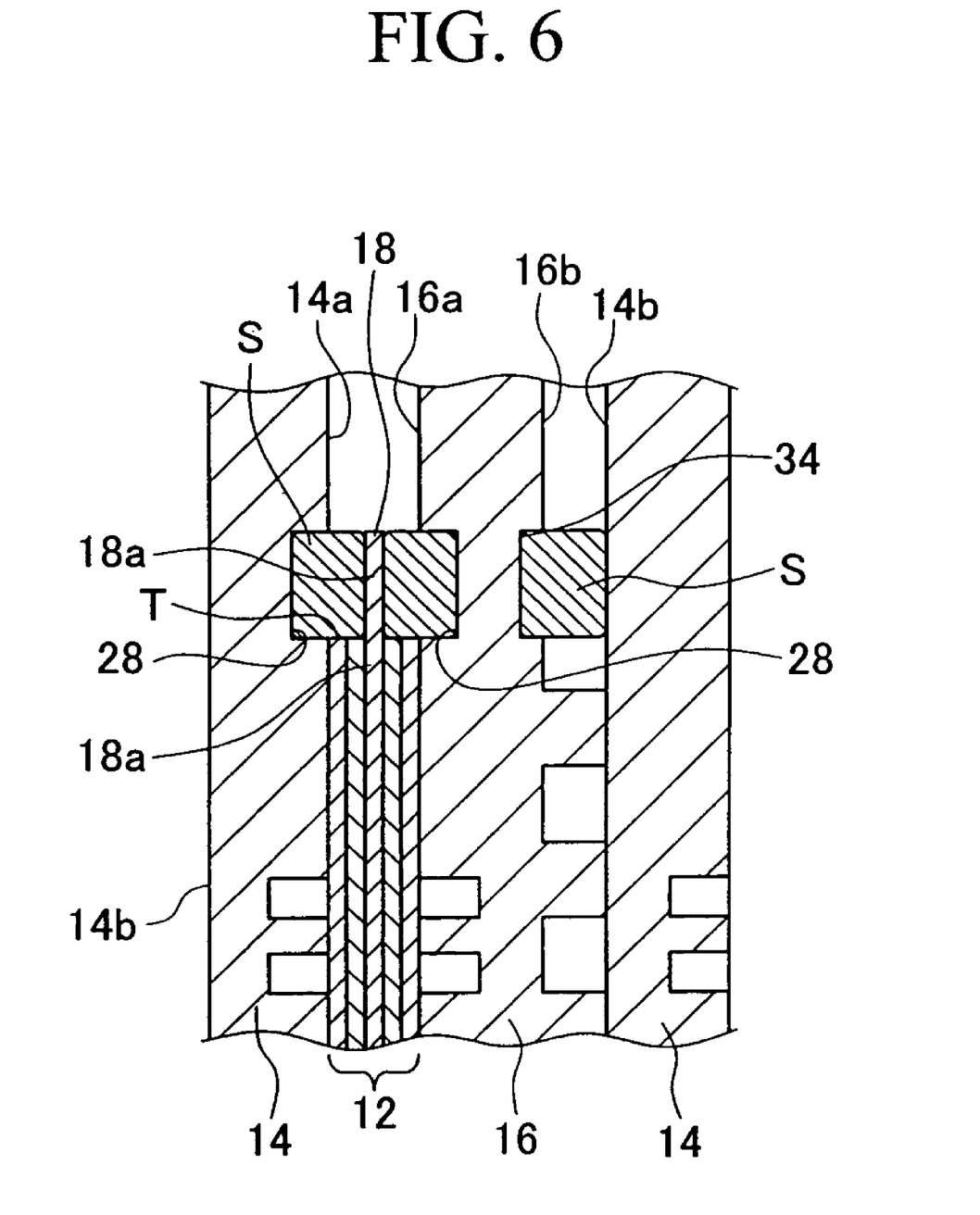
FIG. 6 is an enlarged view showing the main part of FIG. 2.

As shown in FIGS. 2 and 6, the liquid sealant S is put into the grooves 28 and 30 of the first and second separators 14 and 16 holding the membrane electrode assembly 12. The liquid sealant S in the grooves 28 holds and makes direct contact with both sides of the projecting portion 18a, thereby sealing the periphery of the membrane electrode assembly 12. At the same time, the liquid sealant S makes contact with end faces T of the anode electrode 22, the second gas diffusion layer 26, the cathode electrode 20, and the first gas diffusion layer 24, thereby sealing the edge of the membrane electrode assembly 12. The liquid sealant S in one groove 30 makes contact with the liquid sealant S in the other groove 30, thereby sealing the periphery of the openings 36a, 36b, 38a, 38b, 40a, and 40b. It is sufficient that the liquid sealant S makes contact with at least the end faces T of the first gas diffusion layer 24 and the second gas diffusion layer 26. As long as the flow of gas from least one of the anode electrode side and the cathode electrode side is prevented, the efficiency in the electric power generation is not reduced, and both end faces T do not always make contact with the liquid sealant S.

In order to make the liquid sealant S contact with the end faces T of the anode electrode 22, the second gas diffusion layer 20, the cathode electrode 20, and the first gas diffusion layer 24, the liquid sealant S is made contact with the end faces T when applying the liquid sealant S, or when pressing the liquid sealant S held between the first and second separators 14 and 16.

As shown in FIG. 5, a groove 34 encloses the branch channels 74 on the surface 16b of the second separator 16, opposite the surface 14b of the first separator 14 when a plurality of fuel cells are stacked. The liquid sealant S is put into the groove 34. Further, grooves 35 enclose the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b. The liquid sealant S is put into the grooves 35.

The grooves 35 around the inlet side fuel gas opening 36a and the outlet side fuel gas opening 36b enclose the first fuel gas connecting passages 64 and the second fuel gas connecting passages 66. The grooves around the inlet side oxidant gas opening 38a and the outlet side oxidant gas opening 38b enclose the inlet side oxidant gas opening 38a and the outlet side oxidant gas opening 38b on the surface 14b of the first separator 14.

When the fuel cell units 10 are stacked, the surface 14b of the first separator 14 contact the surface 16b of the second separator 16. Then, the liquid sealant S of the second separator 16 arranged around the inlet side fuel gas opening 36a, the inlet side oxidant gas opening 38a, the inlet side coolant opening 40a, the outlet side coolant opening 40b, the outlet side fuel gas opening 36b, the outlet side oxidant gas opening 38b, and the branch channels 74 is in contact with the surface 14b of the first separator 14, and thereby ensures water-tightness between the first separator 14 and the second separator 16.

The liquid sealant S is made of a thermosetting fluorine-containing material or thermosetting silicon. The liquid sealant S has viscosity such that the cross-sectional shape of the sealant does not vary after it has been put into the grooves, and hardens into solid sealant while maintaining a certain degree of elasticity even after the seal has been formed. The sealant may be adhesive, or may not be adhesive. Preferably, those liquid sealant S used between replaceable parts, such as the surface 14b of the first separator 14 and the surface 16b of the second separator 16, are not adhesive. Specifically, the diameter of the applied liquid sealant S is 0.6 mm, and the load on the sealant is 0.5 to 2 N/mm (when this is below 0.5 N/mm, the sealing performance is degraded, and when it is above 2 N/mm, the seal lose elasticity). The widths of the grooves 28, 30, 34, and 35 are 2 mm, and their depths are 0.2 mm. The liquid sealant S put into the grooves 28, 30, 34, and 35 is pressed such that the cross-sectional area of the sealant is increased, thereby compensating for variation in the sizes of the seal sections, and making regular contact with the seal sections.

The operation of the fuel cell of the embodiment will now be explained below.

The fuel gas, for example, a gas which contains hydrogen obtained by reforming a hydrocarbon, is supplied to the fuel cell unit 10, while the oxidant gas, for example, air or a gas which contains oxygen, (hereinafter simply referred to as the air) is supplied to the fuel cell. Further, the coolant is supplied to cool down the electrically active surface. As shown in FIG. 2, the fuel gas is supplied into the inlet side fuel gas opening 36a, flows from the surface 16b through the first fuel gas connecting passages 64 to the surface 16a, and reaches the first fuel gas channels 60 on the surface 16a.

The fuel gas supplied to the first fuel gas channels 60 runs horizontally while meandering vertically downward on the surface 16*a* of the second separator 16 in the direction of gravity. During this travel, the hydrogen gas in the fuel gas is supplied through the second gas diffusion layer 26 to the anode side electrode 22 of the membrane electrode assembly 12. The fuel gas moves through the first fuel gas channels 60 to the anode side electrode 22. The fuel gas is introduced through the second fuel gas channels 62 into the second fuel gas connecting passage 66, reaches the surface 16*b*, and is discharged through the outlet side fuel gas opening 16*b* shown in FIG. 1.

The air supplied into the inlet side oxidant gas opening 38*a* in the fuel cell stack 10 is introduced through the first oxidant gas connecting passages 46, which communicates with the inlet side oxidant gas opening 38*a* of the first separator 14, into the first oxidant gas channels 42. While the air supplied into the first oxidant gas channels 42 moves horizontally while meandering vertically downward in the direction of gravity, the oxygen-containing gas in the air is supplied through the first gas diffusion layer 24 to the cathode side electrode 20. On the other hand, the gas which has not yet been used is discharged through the second oxidant gas channels 44, the second oxidant gas connecting passages 48, and the outlet side oxidant gas opening 38*b* shown in FIG. 1. Thus, the electric energy is generated in the fuel cell unit 10, and is supplied to a motor which is not shown.

Further, the coolant supplied to the fuel cell unit 10 is introduced into the inlet side coolant opening 40*a* shown in FIG. 1, and is supplied through the first coolant connecting passages 76 of the second separator 16 to the main channels 72*a* on the surface 16*b* as shown in FIG. 5. The coolant travels through a plurality of branch channels 74 branched from the main channels 72*a* while cooling down the electrically active surface of the membrane electrode assembly 12, and reaches the main channels 72*b*. Then, the used coolant is discharged through the second coolant connecting passages 78, and the outlet side coolant opening 40*b*.

Figure 7:
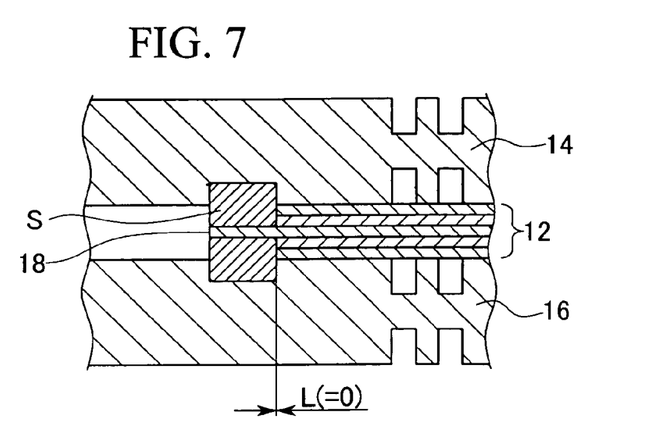
FIG. 7 is a cross-sectional view showing a sample 1 used in an experiment of the embodiment of the present invention.
Figure 8:
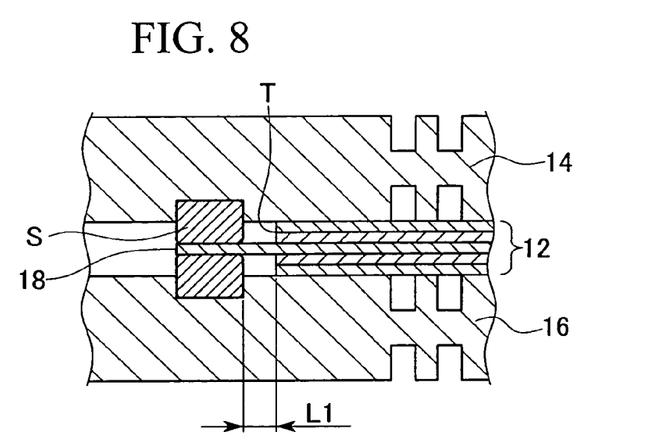
FIG. 8 is a cross-sectional view showing a sample 2 which is a comparative example.

FIGS. 7 and 8 shows the experiments which measures the generated voltage while varying the distance L between the seal S which was liquid at the time of application, and the end faces of the anode electrode 22 and the second gas diffusion layer 26 (or the cathode electrode 20 and the first gas diffusion layer 24).

FIG. 7 shows the sample 1 of the embodiment of the present invention in which L=0, that is, the end faces T make contact with the sealant S.

Figure 9:
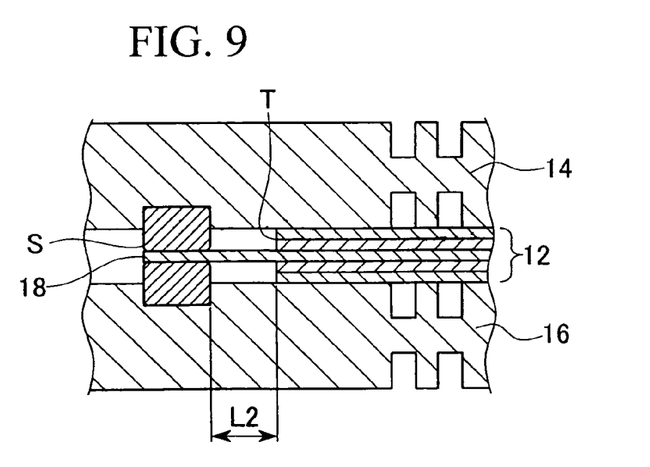
FIG. 9 is a cross-sectional view showing a sample 3 which is a comparative example.

FIG. 8 shows the sample 2 in which the distance between the end faces T and the sealant S is L1 (>0), and FIG. 9 shows the sample 3 in which the distance between the end faces T and the sealant S is L2 (>L1). Specifically, L1=1 mm, L2=2 mm, the pressure of the fuel gas ($H_2$) is 100 kPaG, and the pressure of the oxidant gas ($O_2$) is 100 kPaG. The anode side gas and the cathode side gas are humidified. The solid polymer electrolyte membrane is made of perfluorosulfonic acid polymer (366×186×0.05 mm), and the diffusion layers are made of carbon cloth (310×180×0.6 mm), and the separators (368×188×3 mm) are cut from a burned carbon material.

Figure 10:
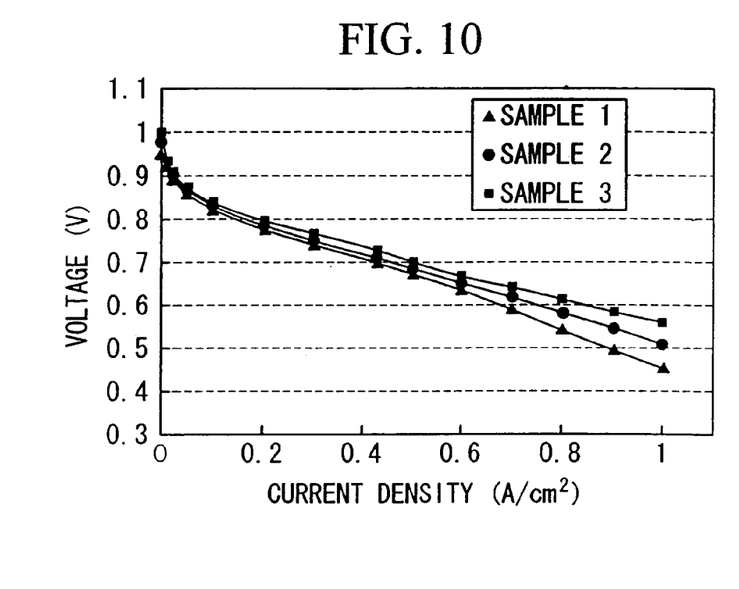
FIG. 10 is a graph showing the results of the experiment.

The results of the experiment, as shown in FIG. 10, shows that, when the vertical axis represents a voltage (V) while the horizontal axis represents an electric current density ($A/cm^2$), the voltage is decreased as the electric current density is increased, and as the distance between the end faces T and the sealant S. The sample 1 in which the end faces T make contact with the sealant S shows the minimum reduction of the voltage.

According to the above embodiment, the liquid sealant S is directly in contact with the projecting portion 18*a* provided at the periphery of the solid polymer electrolyte membrane 18, is pressed between the solid polymer electrolyte membrane 18 and the first and second separators 14 and 16, fitting the varying sizes of the seal sections, and maintains gas-tightness between the solid polymer electrolyte membrane 18 and the first and second separators 14 and 16 while maintaining even pressure on the grooves 28, 30, 34, and 35. Therefore, the reaction force produced by the sealing is uniform throughout the periphery between the first and second separators 14 and 16 and the membrane electrode assembly 12, thereby making the seal uniform.

Particularly, the fit of the liquid sealant S to the varying sizes of the seal sections is satisfactory. Therefore, the manufacturing sizes of the first separator 14, the second separator 16, and the membrane electrode assembly 12 in the directions of thickness need not be so specific. Management of the accuracy in size is easy, and manufacturing costs can be reduced.

Further, the liquid sealant put into the grooves of the first separator 14 and the second separator 16 maintains a regular width within the grooves 28, while making close contact with the projecting portion 18*a* of the solid polymer electrolyte membrane 18, and being pressed according to the sizes of the seal sections. Thus, gas-tightness can be achieved simply by holding the membrane electrode assembly 12 with the first separator 14 and the second separator 16.

The liquid sealant S compensates for the variation in the sizes of the seal sections between the first and second separators 14 and 16 and the projecting portion 18*a* of the solid polymer electrolyte membrane 18, and therefore prevents the partial forces from acting on the separators 14 and 16. Therefore, the separators 14 and 16 can be thin, the fuel cell can be light, and the size of the fuel cell can be reduced. The fuel cell of the present invention is suitable for a vehicle in which the space for the fuel cell is limited, and in which it is desirable for the separators 14 and 16 to be as thin as possible.

Because the liquid sealant S makes direct contact with the solid polymer electrolyte membrane 18, the number of parts and the number of assembling steps can be advantageously reduced, as compared with the case in which a frame is attached to the periphery of the membrane electrode assembly 12. The surface pressures of the liquid sealant S onto the solid polymer electrolyte membrane 18 are uniform, and therefore the force acting on the solid polymer electrolyte membrane 18 is not partial.

Further, the sealant S makes contact with the end faces T of the anode electrode 22 and the second gas diffusion layer 26, and of the cathode electrode 20 and the first gas diffusion layer 24. The reaction gas leaking from the end faces T is prevent from traveling along the peripheries of the fuel cell 12. Thus, the supplied gas reliably contributes to the electric power generation, and contribute to the efficient generation.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

The invention claimed is:

1. A fuel cell comprising:

a membrane electrode assembly having a solid polymer electrolyte membrane, an anode side diffusion electrode located at one side of the solid polymer electrolyte membrane, and a cathode side diffusion electrode disposed at the other side of the solid polymer electrolyte membrane, the anode side diffusion electrode comprising an anode electrode, and a first gas diffusion layer, the cathode side diffusion electrode comprising a cathode electrode, and a second gas diffusion layer, the anode electrode, which is separate from the first gas diffusion layer, being located closer to the solid polymer electrolyte membrane, the cathode electrode, which is separate from the second gas diffusion layer, being located closer to the solid polymer electrolyte membrane;

a pair of separators which hold the membrane electrode assembly; and a liquid sealant having viscosity provided on the separators, which hardens while in close contact with both end faces of the first gas diffusion layer and the second gas diffusion layer to provide a seal with a certain degree of elasticity that prevents flowing of a reaction gas from the ends of the first gas diffusion layer and the second gas diffusion layer, wherein the seal surrounds the first gas diffusion layer and the second gas diffusion layer and makes contact with both end faces of the first gas diffusion layer and the second gas diffusion layer, while the membrane electrode assembly is located between the separators.

2. A fuel cell according to claim 1, further comprising:

a projecting portion which extends from the solid polymer electrolyte membrane and which projects from the peripheries of the anode side diffusion electrode and the cathode side diffusion electrode, wherein the seal makes contact with the projecting portion.

3. A fuel cell according to claim 1, wherein the seal makes contact with end faces of one of the anode electrode and the cathode electrode.

4. A fuel cell according to claim 1, wherein the seal is provided in grooves formed in the separator.

5. A fuel cell comprising:

a membrane electrode assembly having a solid polymer electrolyte membrane, an anode side diffusion electrode located at one side of the solid polymer electrolyte membrane, and a cathode side diffusion electrode disposed at the other side of the solid polymer electrolyte membrane, the anode side diffusion electrode comprising an anode electrode, and a first gas diffusion layer, the cathode side diffusion electrode comprising a cathode electrode, and a second gas diffusion layer, the anode electrode, which is separate from the first gas diffusion layer, being located closer to the solid polymer electrolyte membrane, the cathode electrode, which is separate from the second gas diffusion layer, being located closer to the solid polymer electrolyte membrane;

a pair of separators which hold the membrane electrode assembly; and a liquid sealant having viscosity provided in grooves formed in the separators, which hardens while in close contact with at least one end face of one of the first gas diffusion layer and the second gas diffusion layer to provide a seal with a certain degree of elasticity, wherein the seal surrounds the first gas diffusion layer and the second gas diffusion layer and makes contact an end face of one of the first gas diffusion layer and the second gas diffusion layer, while the membrane electrode assembly is located between the separators and wherein the seal is provided in grooves formed in the separator.

6. A fuel cell comprising:

a membrane electrode assembly having a solid polymer electrolyte membrane, an anode side diffusion electrode located at one side of the solid polymer electrolyte membrane, and a cathode side diffusion electrode disposed at the other side of the solid polymer electrolyte membrane, the anode side diffusion electrode comprising an anode electrode, and a first gas diffusion layer, the cathode side diffusion electrode comprising a cathode electrode, and a second gas diffusion layer, the anode electrode, which is separate from the first gas diffusion layer, being located closer to the solid polymer electrolyte membrane, the cathode electrode, which is separate from the second gas diffusion layer, being located closer to the solid polymer electrolyte membrane;

a projecting portion which extends from the solid polymer electrolyte membrane and which projects from the peripheries of the anode side diffusion electrode and the cathode side diffusion electrode, a pair of separators which hold the membrane electrode assembly; and a liquid sealant having viscosity provided on the separators on either side of the projecting portion, which hardens while in close contact with both end faces of the first gas diffusion layer and the second gas diffusion layer to provide a seal with a certain degree of elasticity on both sides of and in contact with the projecting portion, wherein the seal makes contact with both end faces of the first gas diffusion layer and the second gas diffusion layer, while the membrane electrode assembly is located between the separators.

* * * * *